US008663417B2

(12) United States Patent
Braun

(10) Patent No.: US 8,663,417 B2
(45) Date of Patent: Mar. 4, 2014

(54) INSTALLATION SYSTEM FOR QUICKLY ATTACHING FASTENING ELEMENTS BY MEANS OF LIGHT-CURING ADHESIVES

(75) Inventor: Frank Braun, Gruendau (DE)

(73) Assignee: nie wieder bohren ag, Hanau (DE)

( * ) Notice: Subject to any disclaimer, the term of this patent is extended or adjusted under 35 U.S.C. 154(b) by 0 days.

(21) Appl. No.: 13/378,692

(22) PCT Filed: Jun. 25, 2010

(86) PCT No.: PCT/EP2010/003824
§ 371 (c)(1), (2), (4) Date: Dec. 16, 2011

(87) PCT Pub. No.: WO2011/000503
PCT Pub. Date: Jan. 6, 2011

(65) Prior Publication Data
US 2012/0090777 A1 Apr. 19, 2012

(30) Foreign Application Priority Data
Jun. 29, 2009 (DE) ........................ 10 2009 031 188

(51) Int. Cl.
*B29C 65/48* (2006.01)
*F16B 47/00* (2006.01)
*A47G 29/00* (2006.01)

(52) U.S. Cl.
USPC ..... 156/275.5; 156/273.7; 411/82; 248/205.3

(58) Field of Classification Search
USPC ........................ 156/275.5, 272.2, 273.7, 295; 248/205.1, 205.3, 200; 411/82, 82.1, 411/82.3
See application file for complete search history.

(56) References Cited

U.S. PATENT DOCUMENTS 5,277,530 A * 1/1994 Sweeney et al. .............. 411/258
7,207,543 B2 * 4/2007 Ortwein ........................ 248/467
2002/0134489 A1 * 9/2002 Sweeney et al. .............. 156/108

FOREIGN PATENT DOCUMENTS

| | | | |
|---|---|---|---|
| DE | 4416884 | A1 | 11/1995 |
| DE | 10152053 | A1 | 5/2003 |
| EP | 0823561 | A1 | 2/1998 |
| EP | 1947156 | A1 | 7/2008 |
| JP | 2001054945 | A | 2/2001 |
| WO | 0181774 | A1 | 11/2001 |
| WO | 03036106 | A1 | 5/2003 |

OTHER PUBLICATIONS

English Machine Translation for EP 1947156.*
PCT Application No. PCT/EP2010/003824, English translation of International Preliminary Report on Patentability.
English abstract of WO03036106 (A).

(Continued)

*Primary Examiner* — Richard Crispino
*Assistant Examiner* — Elizabeth Royston
(74) *Attorney, Agent, or Firm* — Cahn & Samuels, LLP

(57) ABSTRACT

An installation system for mounting stationary objects, such as towel holders, shelves, lights, or similar furnishing items, on an installation surface, such as a wall or a ceiling, in particular in rooms equipped with tiles, marble slabs, or similar wall coverings, includes one or more fastening elements, a lighting device, and/or an adhering and connecting agent, wherein the adhering and connecting agent is a light-curing adhesive. The one or more fastening elements can be fastened by introducing an adhering and connecting agent into an adhesive space formed by the installation surface and components of the fastening element. The fastening element has at least one at least partially transparent component for irradiating the adhering and connecting agent.

15 Claims, 7 Drawing Sheets

34 24 42 20 36 38 27 12 10 16 18 26 22 14

(56) References Cited

OTHER PUBLICATIONS

English abstract of DE10152053 (A1).
English abstract of DE4416884 (A1).
English abstract of WO0181774 (A1).
English abstract of EP1947156 (A1).
English abstract of JP2001054945 (A).
English abstract of English abstract of EP0823561 (A1).

* cited by examiner

INSTALLATION SYSTEM FOR QUICKLY ATTACHING FASTENING ELEMENTS BY MEANS OF LIGHT-CURING ADHESIVES

This patent application is a U.S. national stage application of PCT international application PCT/EP2010/003824 filed on 25 Jun. 2010 and claims priority of German patent document 10 2009 031 188.2 filed on 29 Jun. 2009.

FIELD OF THE INVENTION

The invention concerns an installation system for mounting stationary objects, such as towel holders, shelves, lights or similar furnishing items, on an installation surface, such as a wall or a ceiling, in particular in rooms fitted out with tiles, marble slabs or similar wall coverings, comprising one or more fastening elements, a lighting device and/or an adhering and connecting agent.

BACKGROUND OF THE INVENTION

Many installation systems for attaching fastening elements of a wide variety of embodiments and materials on walls in bathrooms and kitchens are known from the prior art, there being the problem, particularly for such walls and the wall coverings thereof in the form of tiles or marble slabs, that, for example in the case of a tiled wall, the fastening elements are fastened in the traditional way in the joints between the tiles, in particular through holes drilled in the region where the joints intersect, often with the result that the tiles adjacent the respective joint become damaged or chipped or develop cracks in their glazing, which, apart from visually perceptible deteriorations in quality, also cause subsequent damage involving laborious reworking or, if the fastening point is relocated elsewhere or inappropriate installations are carried out in tucked-away regions, such as corners and edges, not only is it difficult to attach the fastening elements but there are also unsightly dowel holes that have to be filled in again. For this reason, the fastening elements are often fastened by means of a wide variety of adhesive connections, which however must meet the requirements that the fastening elements have to withstand relatively great forces in order to accept elements for the mounting of stationary objects, such as towel holders, shelves, etc., while taking into account the structural conditions, such as the strength of the adhesive, the strength of the fastening element, the surface-area loading of the installation system and the structure of the wall systems.

Fastening elements for adhesive bonding on smooth surfaces are known from the published patent applications WO 03/036106 A1, DE 101 52 053 A1, WO 01/81774 A1 and DE 44 16 884. These fastening elements have a filling opening, by way of which an adhering and connecting agent can be introduced into a cavity between the fastening element and a ceiling or wall. To allow excess adhering and connecting agent and the air that has been displaced by the adhering and connecting agent entering the cavity to escape, the fastening elements may be provided with rising openings or open-pored components. Adhesive films make fixing of the fastening elements possible during the drying phase of the adhering and connecting agent introduced.

One problem which the prior art has not so far been able to solve results from the period of time that elapses before an adhesive connection can sufficiently withstand loads. This causes long waiting times, which delay work. In the case of applications in the domestic sector, it is even customary for an installer to have to travel to the site more than once—for adhesively attaching a fastening element and for subsequently mounting an object on the fastening element.

PROBLEM

Proceeding from the prior art described, the invention addresses the problem of providing an installation system for attaching fastening elements which are designed for mounting stationary objects, such as towel holders, shelves, lights or similar furnishing items, on an installation surface, such as a wall or a ceiling, in particular in rooms fitted out with tiles, marble slabs or similar wall coverings, the waiting time between the adhesive bonding of the fastening element to the installation surface and the attachment of the stationary objects being eliminated or greatly reduced.

SUMMARY OF INVENTION

This problem is solved by the inventions with the features of the independent claims. Advantageous developments of the inventions are characterized in the dependent claims. The wording of all the claims is hereby made the content of this description by reference. The invention also comprises all appropriate combinations, and in particular all mentioned combinations, of independent and/or dependent claims.

For mounting stationary objects, such as towel holders, shelves, lights or similar furnishing items, on an installation surface, such as a wall or a ceiling, in particular in rooms fitted out with tiles, marble slabs or similar wall coverings, such as wall coverings consisting of wood, glass, stone, ceramic or plastic, the invention proposes an installation system. This installation system comprises one or more fastening elements, at least one lighting device and/or an adhering and connecting agent. The adhering and connecting agent is a light-curing adhesive.

The fastening element is designed such that it can be fastened on the installation surface by introducing the adhering and connecting agent into an adhesive space. Furthermore, the fastening element is designed such that—once the adhering and connecting agent has cured—the stationary objects can be attached to the fastening element.

The adhesive space is formed by the installation surface together with one or more components of the fastening element, i.e. each delimiting surface of the adhesive space is identical to part of the installation surface or part of the surface of one of the components of the fastening element that form the adhesive space. If a sufficient quantity of the adhering and connecting agent is introduced into the adhesive space, the adhering and connecting agent introduced comes into contact with the installation surface and the components of the fastening element that form the adhesive space. After the curing of the adhering and connecting agent, there is a material-bonding connection between the installation surface and the fastening element.

The adhering and connecting agent may be introduced in sufficient quantity into the adhesive space in various ways. For instance, it is possible before the placement of the fastening element onto the installation surface to apply the adhering and connecting agent to the installation surface or to the fastening element in such a way that the adhering and connecting agent is located in the adhesive space when the fastening element is placed onto the installation surface. Preferably, the fastening element has a recess which, together with the installation surface, forms the adhesive space. Before placement onto the installation surface, this recess may be filled with the adhering and connecting agent. Preferably, the volume of the adhering and connecting agent that is introduced is equal to or exceeds the volume defined by the recess.

A preferred embodiment of the fastening element has at least one filling opening, through which the adhering and connecting agent can be introduced in sufficient quantity into the adhesive space when the fastening element has been placed onto the installation surface. To allow excess adhering and connecting agent and the air that has been displaced by the adhering and connecting agent entering to escape, the fastening element may also be provided with one or more rising openings or consist in parts of an open-pored material.

After the placement of the fastening element onto the installation surface, the introduction of the adhering and connecting agent into the adhesive space and the curing of the adhering and connecting agent, the stationary objects can be mounted on the fastening element. To minimize the waiting time before the mounting of the stationary objects, in a novel embodiment a light-curing adhesive is used as the adhering and connecting agent.

Light-curing or photoinitiated-curing adhesives are usually single-component adhesives which cure under the effect of electromagnetic activating radiation as an initiator of a chemical reaction. The absorption spectrum, i.e. the spectrum of wavelengths that lead to the curing of the adhesive, usually lies here in a range between 320 nm and 550 nm. As a difference from rapidly curing adhesives, such as cyanoacrylate adhesives (instant adhesives), the curing in the case of light-curing adhesives takes place in a controlled manner. In particular, the installer can individually determine the moment from which the curing of the adhesive takes place—initiated by the irradiation. It is thus ensured that sufficient time is available to fill the adhesive into the adhesive space and possibly adjust the fastening element on the installation surface.

According to the invention, at least one of the components of the fastening element that form the adhesive space is at least partially transparent. In particular, this at least one at least partially transparent component of the fastening element is transparent in such a way that irradiation of the adhering and connecting agent with an activating radiation through this at least one transparent component of the fastening element leads to the curing of the adhering and connecting agent. This means that the transmission range of the at least one at least partially transparent component at least partially overlaps with the absorption spectrum of the adhesive that is used as the adhering and connecting agent. There are therefore ranges of wavelengths that are contained both in the transmission range of the at least one at least transparent component and in the absorption spectrum of the adhesive. The components of the fastening element that are not among the at least partially transparent components of the fastening element may be opaque. This makes it possible for the fastening element to be designed in such a way that it can sufficiently withstand loads.

It is possible to irradiate the adhering and connecting agent with activating radiation through the at least one at least partially transparent component of the fastening element after the placement of the fastening element onto the installation surface and introduction of the adhering and connecting agent into the adhesive space. This leads to curing of the adhering and connecting agent. Even after a very short waiting time, the adhesive connection produced in this way can sufficiently withstand loads, so that the stationary objects can be mounted on the fastening element. Depending on the light source that is used for the irradiation and the light-curing adhesive that is used as the adhering and connecting agent, the waiting time lies between 1 sec and several minutes, but at most 10 min, preferably less than 5 min.

According to the invention, one of the at least partially transparent components of the fastening element is formed as a first ring, the adhesive space being located inside this first ring. In this case, the adhesive space is formed by the first ring, the installation surface and a main body belonging to the fastening element. Preferably, the main body is opaque. The first ring may be designed as an O-ring with a circular or oval cross-sectional area. To avoid undesired refraction of the activating radiation, however, the first ring preferably has a rectangular cross-sectional area. The base area of the first ring may be formed in any way desired, for instance as a rectangle, but preferably as a circle. The first ring may be adhesively bonded to the main body. Alternatively, the main body has a peripheral recess which positively or non-positively connects the first ring to the main body. Preferably, the first ring is arranged inside the fastening element such that, when the fastening element is placed onto the installation surface, it comes into contact with said element. To pre-fix the fastening element on the installation surface, an end face, i.e. an area remote from the base area and proximate to the installation surface, of the first ring may have an adhesive layer, for example in the form of an adhesive film.

Preferably, a second of the at least partially transparent components of the fastening element that form the adhesive space is formed as a second ring, the adhesive space being located outside this second ring. In this case, the adhesive space is formed by the second ring, the installation surface and the main body. Like the first ring, the second ring may be designed as an O-ring with a circular or oval cross-sectional area. To avoid undesired refraction of the activating radiation, however, the second ring preferably has a rectangular cross-sectional area. The base area of the second ring may be formed in any way desired, for instance as a rectangle, but preferably as a circle. The second ring may be adhesively bonded to the main body. Alternatively, the main body has a recess which positively or non-positively connects the second ring to the main body. Preferably, the second ring is arranged inside the fastening element such that, when the fastening element is placed onto the installation surface, it comes into contact with said element. To pre-fix the fastening element on the installation surface, an end face, i.e. an area remote from the base area and proximate to the installation surface, of the second ring may have an adhesive layer, for example in the form of an adhesive film.

The fastening element may comprise the first ring without the second ring or the second ring without the first ring. Preferably, both the first ring and the second ring belong to the fastening element. In this case, the second ring is arranged inside the first ring, so that the adhesive space is located between the first ring and the second ring, the adhesive space being formed by the first ring, the second ring, the main body and the installation surface. This makes it possible for the adhering and adhesive agent to be irradiated both through the first ring and through the second ring. The width of the adhesive space or the distance between the first ring and the second ring can consequently be increased.

To be able to irradiate the adhering and connecting agent through the second ring when the fastening element has been placed on the installation surface, the fastening element preferably has an insertion opening. The main body, the insertion opening, the second ring and the installation surface enclose a cavity into which a light source which irradiates at least the second ring can be inserted through the insertion opening. This light source preferably generates activating radiation, which irradiates and cures the adhering and connecting agent through the second ring.

It is advantageous that the insertion opening can be closed with a receiving element. Alternatively, this receiving element may be attached at other locations of the main body or of the fastening element. The receiving element serves the purpose of fixing on the fastening element the stationary objects to be mounted. For receiving and fixing the stationary objects, the receiving element may have an internal thread, an external thread or other fixing mechanisms known to a person skilled in the art. Furthermore, it may form a material unit with the main body or with the fastening element or be connected to the main body or the fastening element, for example by pressing in, riveting on, adhering or screwing in.

In a further embodiment, at least one of the delimiting surfaces of the adhesive space that are identical to part of the surface of one of the at least partially transparent components of the fastening element runs substantially parallel to the installation surface, i.e. the at least one of the limiting surfaces of the adhesive space runs parallel to the installation surface if production tolerances and surface irregularities are ignored. For example, windows of a transparent material, which is transparent in particular for radiation of the wavelength that leads to the curing of the adhering and connecting agent, may be let into the optically dense main body, i.e. consisting of opaque material. It is also possible to produce the main body completely from a transparent material.

It is also advantageous that at least one filling opening and/or at least one rising opening can be closed with in each case one of the at least partially transparent components of the fastening element once the adhering and connecting agent has been introduced into the adhesive space through the at least one filling opening. This makes irradiation of the adhering and connecting agent possible through the at least one filling opening closed by one of the at least partially transparent components of the fastening element and/or through at least one rising opening closed with one of the at least partially transparent components of the fastening element, so that the adhering and connecting agent cures. In this case, the light source which generates the activating radiation does not come into direct contact with the adhering and connecting agent. In particular, damage to the light source caused by contact with the not yet cured adhering and connecting agent is avoided.

In a preferred embodiment, at least one of the at least partially transparent components of the fastening element reflects, refracts and/or diffuses light. Reflection, refraction or diffusion of the activating radiation through the at least one of the at least partially transparent components of the fastening element is especially advantageous. This makes it possible to introduce the activating radiation even into shadow zones possibly present within the adhesive space. Moreover, in this way large regions of the adhesive space can be irradiated by means of comparatively small at least partially transparent components of the fastening element. This improves the possibilities for structurally designing the fastening element. In particular, large parts of the fastening element can be designed as opaque components.

A first lighting device, designed for curing a light-curing adhesive, has at least one light source, which can be inserted through the insertion opening of the fastening element into the cavity enclosed by the main body, the insertion opening, the second ring and the installation surface. If this at least one light source is inserted into this very cavity, the second ring is located in the path of rays of the at least one light source. This means that the second ring is irradiated by the at least one light source directly and, in particular, is not impinged exclusively by indirect and/or diffuse light. Preferably, the inner surface of the second ring is in this case irradiated completely. The light source refers to the location of the lighting device from which the light is emitted into the surroundings. The at least one light source preferably generates activating radiation in a wavelength and at an intensity that lead to the curing of the adhesive used as the adhering and connecting agent. In particular, the emission spectrum of the at least one light source, i.e. the spectrum of the wavelengths of the activating radiation generated by this light source, overlaps with the absorption spectrum of the adhesive used as the adhering and connecting agent. Preferably, the at least one light source also generates activating radiation in a wavelength and at an intensity that lead to the curing of the adhesive used as the adhering and connecting agent when it irradiates the adhesive through the second ring. In particular, the emission spectrum of the at least one light source, the absorption spectrum of the adhesive used as the adhering and connecting agent and the transmission spectrum of the second ring overlap in a common range. In the inserted state of the lighting device, the path of rays of the at least one light source preferably runs parallel to the installation surface. To irradiate the inner surface of the second ring completely, the path of rays of the at least one light source also preferably has a disk-shaped geometry. Alternatively, disk segments or cylinders are conceivable as the geometry of the path of rays of the at least one light source. Preferably, a number of paths of rays that respectively have the form of a disk segment thereby combine to form a common path of rays in the form of a disk. If the first lighting device only partially irradiates the inner surface of the second ring, complete curing of the adhering and connecting agent can be achieved by turning the lighting device about its own axis.

A second lighting device, designed for curing a light-curing adhesive, has at least two light sources and can be placed onto the installation surface, so that the fastening element, comprising the first ring, is located between the at least two light sources. When the lighting device has been placed onto the installation surface and the fastening element is located between the at least two light sources, the first ring is located in the paths of rays of the at least two light sources. These at least two light sources preferably generate activating radiation in a wavelength and at an intensity that lead to the curing of the adhesive used as the adhering and connecting agent. In particular, the emission spectrum of the at least two light sources, i.e. the spectrum of the wavelengths of the activating radiation generated by these light sources, overlaps with the absorption spectrum of the adhesive used as the adhering and connecting agent. Preferably, the at least two light sources also generate activating radiation in a wavelength and at an intensity that lead to the curing of the adhesive used as the adhering and connecting agent when it irradiates the adhesive through the second ring. In particular, the emission spectrum of the at least two light sources, the absorption spectrum of the adhesive used as the adhering and connecting agent and the transmission spectrum of the second ring overlap in a common range. In the placed state of the lighting device, the paths of rays of the at least two light sources preferably run parallel to the installation surface. If the second lighting device only partially irradiates the outer surface of the first ring, complete curing of the adhering and connecting agent can be achieved by turning the lighting device about its own axis.

A third lighting device, designed for curing a light-curing adhesive, has an annular light source and can be placed onto the installation surface, so that the fastening element, comprising the first ring, is located inside the annular light source. When the lighting device has been placed onto the installation surface and the fastening element is located inside the annular light source, the first ring is located in the path of rays of the annular light source. In particular, the outer surface of the first ring is completely irradiated by this annular light source. The annular light source preferably generates activating radiation in a wavelength and at an intensity that lead to the curing of the adhesive used as the adhering and connecting agent. In particular, the emission spectrum of the annular light source, i.e. the spectrum of the wavelengths of the activating radiation generated by this light source, overlaps with the absorption spectrum of the adhesive used as the adhering and connecting agent. Preferably, the annular light source also generates activating radiation in a wavelength and at an intensity that lead to the curing of the adhesive used as the adhering and connecting agent when it irradiates the adhesive through the second ring. In particular, the emission spectrum of the annular light source, the absorption spectrum of the adhesive used as the adhering and connecting agent and the transmission spectrum of the second ring overlap in a common range. In the placed state of the lighting device, the path of rays of the annular light source preferably runs parallel to the installation surface.

Instead of the second or third lighting device, a commercially available curing lamp may be used as the light source for irradiating the adhering and connecting agent with activating radiation that leads to the curing of the adhering and connecting agent through the first ring. To irradiate the adhering and connecting agent completely, the installer must make such a curing lamp move along a concentric path around the first ring in such a way that the cone of light of the curing lamp is always oriented in the direction of the first ring, i.e. the first ring is always located in the cone of light of the curing lamp. However, this entails the risk that the adhering and connecting agent is not sufficiently irradiated as a result of possible incorrect operation.

According to the invention, a fourth lighting device for curing a light-curing adhesive comprises a lighting device described above as the first lighting device, with at least one light source, which can be inserted through the insertion opening of the fastening element, and one of the lighting devices described above as the second lighting device, with at least two light sources, or as the third lighting device, with an annular light source, for placing onto the installation surface. In this case, the fourth lighting device, the lighting device described as the first lighting device and the lighting device described as the second or third lighting device form a structural unit. With the fourth lighting device, the adhering and connecting agent may be irradiated with activating radiation simultaneously through the first ring and through the second ring. This simplifies the fastening of the fastening element on the installation surface and leads to more uniform curing of the adhering and connecting agent. If the fourth lighting device only partially irradiates the outer surface of the first ring or the inner surface of the second ring, complete curing of the adhering and connecting agent can be achieved by turning the lighting device about its own axis.

An installation system according to the invention for mounting stationary objects, such as towel holders, shelves, lights or similar furnishing items, on an installation surface, such as a wall or a ceiling, in particular in rooms fitted out with tiles, marble slabs or similar wall coverings, comprises one or more of the fastening elements described above and/or at least one of the lighting devices described above. In addition, the installation system may comprise an adhering and connecting agent, which is a light-curing adhesive.

A method according to the invention using one or more of the fastening elements described above, at least one of the lighting devices described above and an adhering and connecting agent, which is a light-curing adhesive, for mounting stationary objects, such as towel holders, shelves, lights or similar furnishing items, on an installation surface, such as a wall or a ceiling, in particular in rooms fitted out with tiles, marble slabs or similar wall coverings, comprises the following steps: placing the fastening element onto the installation surface, introducing the adhering and connecting agent and curing the adhering and connecting agent by irradiation with at least one of the lighting devices.

Also claimed is the use of one or more of the fastening elements described above, at least one of the lighting devices described above and an adhering and connecting agent, which is a light-curing adhesive, for mounting stationary objects, such as towel holders, shelves, lights or similar furnishing items, on an installation surface, such as a wall or a ceiling, in particular in rooms fitted out with tiles, marble slabs or similar wall coverings. In addition, any desired further uses in which an object is to be fixed on a surface are conceivable. In particular, the fastening elements, the lighting devices, the adhering and connecting agent and/or the installation system may be used for fastening other devices on surfaces.

Further details and features emerge from the following description of preferred exemplary embodiments in conjunction with the dependent claims. The respective features may be realized on their own or together in combination with one another. The possibilities of solving the problem are not restricted to the exemplary embodiments. Thus, for example, statements of ranges always include all—unmentioned—intermediate values and all conceivable subintervals.

BRIEF DESCRIPTION OF THE DRAWINGS

The exemplary embodiments are schematically represented in the figures. The same reference numerals in the individual figures thereby designate elements that are the same or functionally the same or correspond to one another with regard to their functions. Specifically.

DETAILED DESCRIPTION OF INVENTION

Figure 1:
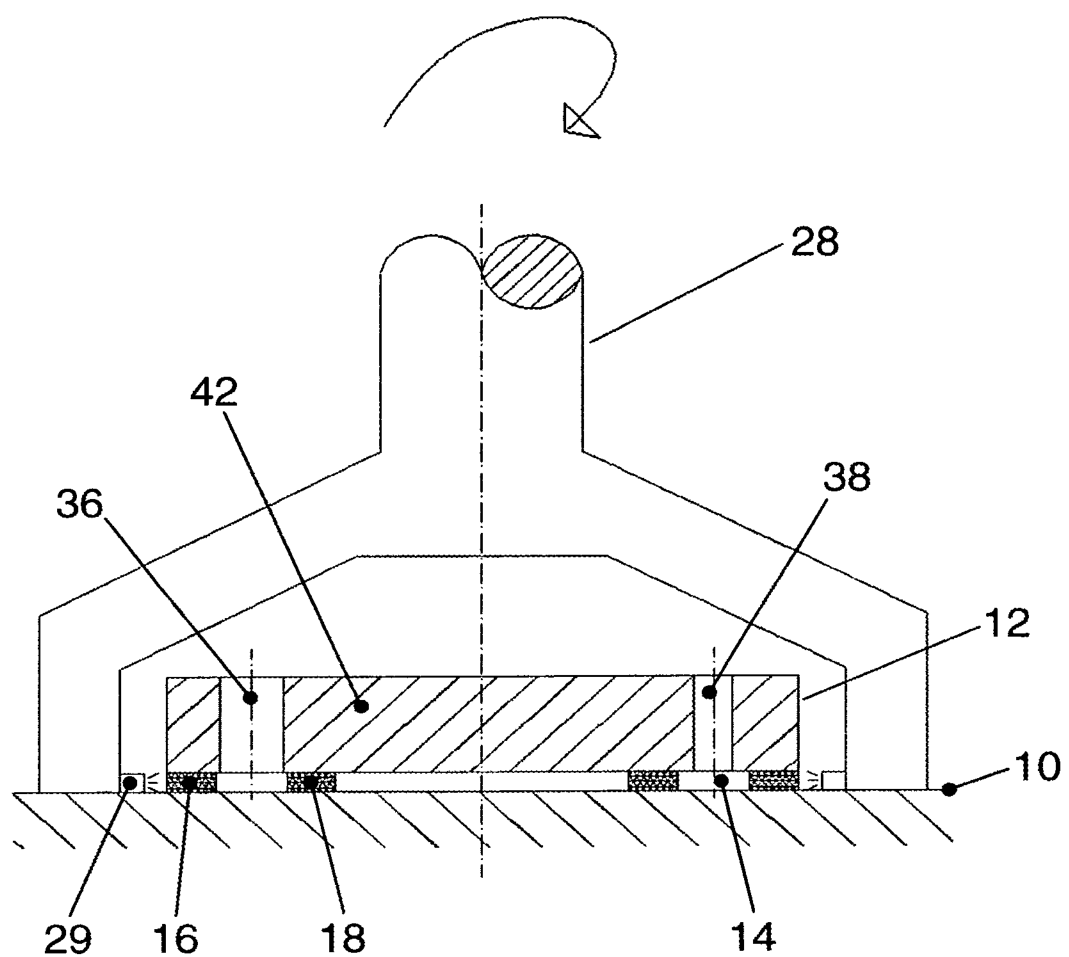
FIG. 1 shows a fastening element with a lighting device for placing.
Figure 2:
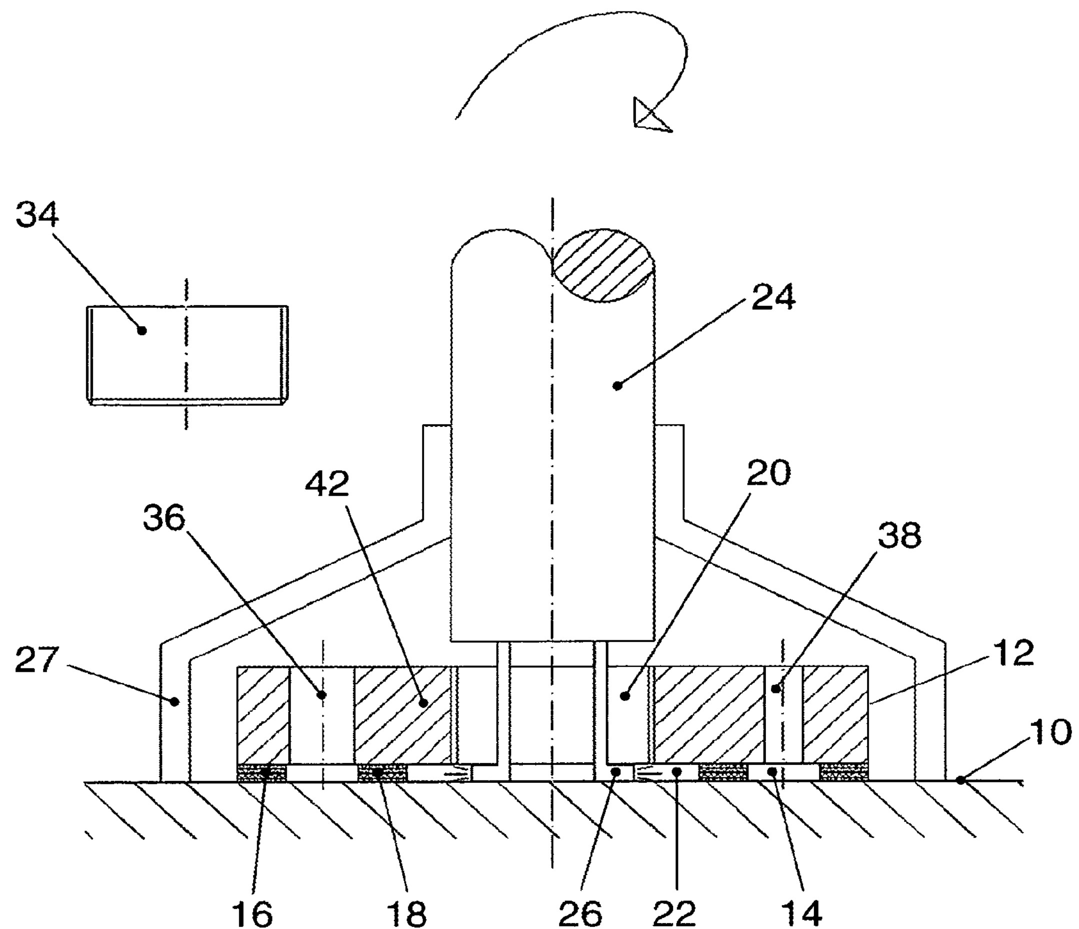
FIG. 2 shows a fastening element with a lighting device for inserting.

FIGS. 1 to 8 show embodiments of the fastening element 12 that are given by way of example. This element consists of a main body 42, a first ring 16 and a second ring 18 and has an adhesive space 14. Serving for fastening the stationary objects to be mounted is a receiving element 34. This element may, for example—as represented in FIG. 2—be screwed to the main body or be detachably connected to the main body 42 by means of a riveted connection represented in FIG. 8. The fastening element 12 may also have an insertion opening 20, a filling opening 36 and/or a rising opening 38.

Both the first ring 16 and the second ring 18 have a rectangular cross-sectional area and are adhesively bonded to the main body. Both rings 16, 18 may consist of a transparent material, which is transparent particularly to radiation of the wavelength that leads to the curing of the adhering and connecting agent. Suitable materials for the rings 16, 18 are, for instance, glass, Plexiglas or transparent plastic, preferably transparent double-sided adhesive film. If, as represented in FIG. 1, FIGS. 3 to 5 and FIGS. 7 and 8, the insertion opening 20 is absent, the second ring 18 may also consist of an optically dense material.

Similarly, in the case of the embodiments shown in FIGS. 1 to 7, the main body 42 consists of an optically dense, i.e. opaque, material, for example metal, plastic and/or ceramic. In this way, the main body can withstand the forces of the mounted stationary objects without becoming damaged and pass them on to the installation surface by way of the adhesive connection.

Figure 7:
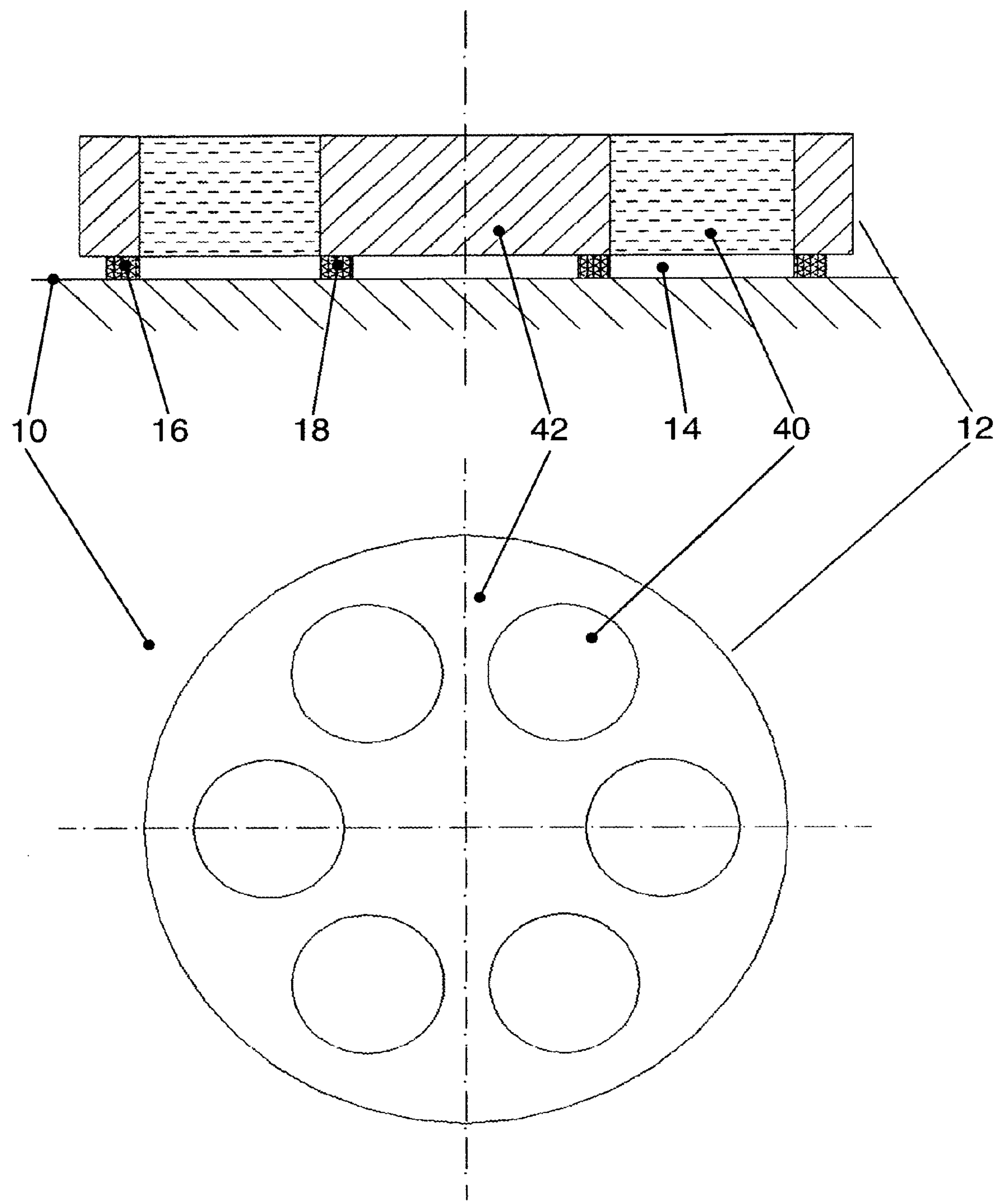
FIG. 7 shows a fastening element with windows.

FIG. 7 shows an embodiment of the fastening element 12 in which transparent windows 40, which form a delimiting surface of the adhesive space 14 running parallel to the installation surface 10, have been let into the main body 42. This makes it possible for the adhering and connecting agent to be irradiated through the windows 40, the path of rays of the lighting device that is used running perpendicularly to the installation surface 10. In this case, both the first ring 16 and the second ring 18 may consist of an optically dense material. Furthermore, it is possible to omit the second ring 18, so that the entire region inside the first ring 16 forms the adhesive space 14.

Figure 8:
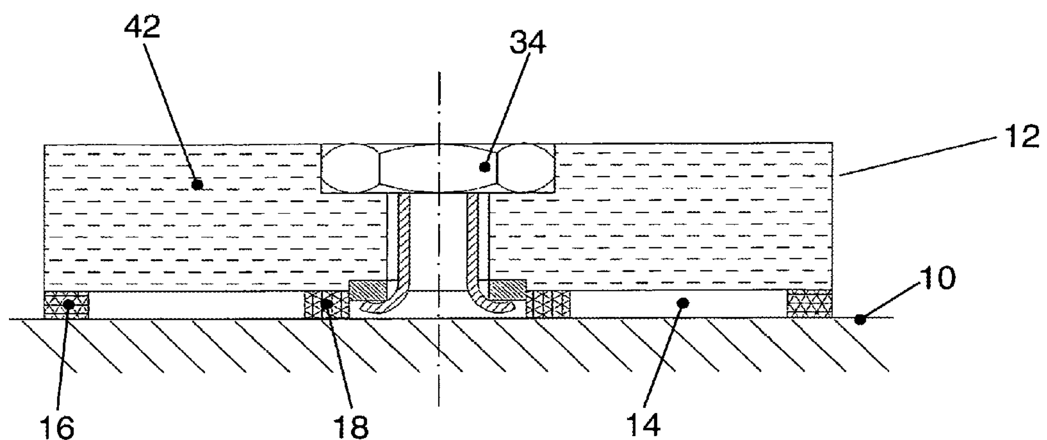
FIG. 8 shows a fastening element with a transparent main body.

The main body 42 of the embodiment represented in FIG. 8 consists of a transparent material. In particular, the main body forms a delimiting surface of the adhesive space 14 running parallel to the installation surface 10. This makes it possible for the adhering and connecting agent to be irradiated completely through the main body 42. To prevent the main body 42 from being damaged by the stationary objects to be mounted, in the mounted state the stationary objects preferably rest on the main body 42, so that torsional moments occurring are not introduced into the receiving element 34 but are supported by the main body 42. For this purpose, in FIG. 8 the receiving element 34 has been let into a recess of the main body 42. By analogy with FIG. 7, here both the first ring 16 and the second ring 18 may consist of an optically dense material.

To give the fastening element a visually attractive appearance, it may be provided with a cap-shaped covering panel—not depicted. This panel is fitted over the fastening element 12 adhesively bonded on the installation surface 10, the receiving element 34 being guided through a hole in the panel. This panel is for its part fixed on the receiving element 34 by the mounting of one of the stationary objects. Alternatively, the covering panel may be provided on its inner lateral surface with a thread for screwing onto the main body 42. In this case, instead of the main body 42, the covering panel is provided with the receiving element 34.

Depending on the requirements that exist for the fastening element, various light-curing adhesives may be used as the adhering and connecting agent. For instance, adhesives which, depending on their composition, cure when irradiated with wavelengths in the range between 280 nm and 550 nm are available. Depending on the composition of the adhesive and the light source that is used, the curing times of light-curing adhesives lie between 1 sec and several minutes, but at most 10 min, preferably less than 5 min. Furthermore, full-curing depths of up to 5 mm can be achieved. The width of the adhesive space 14 or the distance between the two rings 16, 18 may consequently be up to 10 mm. In this case, the material to be penetrated for the irradiation also plays an important role of course. Adhesives that cure at longer wavelengths normally require somewhat longer for curing, but have a greater full-curing depth. However, LED technology means that light sources that can emit a very intensive radiation, which can shorten the curing times, are available today.

The adhesive used may be an acrylate-based or epoxy-based adhesive. The corresponding wavelength for the activation may in this case be set by photoinitiators. Acrylate adhesives, in particular acrylate adhesives which cure by free-radical polymerization, are preferred.

The adhesive may also comprise a secondary curing system. In this case, after the irradiation and initiation of the polymerization by irradiation, a further secondary curing reaction that does not require irradiation takes place. This makes curing also possible in regions that were not exposed to the irradiation (shadow zones). Possible systems are anaerobic curing or curing by metal contact, but also heat, i.e. subsequent heating of the fastening element. In the case of anaerobic curing, it may be required that the fastening element consists at least in parts of a substance, for example of aluminum, copper, steel or ceramic, which can emit to the adhesive the metal ions required for the curing, for example of aluminum, copper, steel or ceramic. It may also be a corresponding coating of the fastening element.

To fasten the fastening element 12 to the installation surface 10, the fastening element 12 is first pre-positioned on the installation surface 10. For this purpose, the rings 16, 18 are provided with a fast-acting adhering agent on their side remote from the main body 42 or their side proximate to the installation surface 10. Suitable, for example, is a transparent double-sided adhesive film which on one side is permanently adhesively bonded to the main body 42 and on the other side has an adhesive surface provided with a protective film. After peeling off the protective film, the fastening element 12 can be pre-fixed on the installation surface. After that, the adhering and connecting agent is introduced into the adhesive space 14 through the filling opening 36 in the main body 42. By irradiating the adhering and connecting agent through the rings 16, 18, the windows 40 or the transparent main body 42, the adhering and connecting agent finally cures, so that the stationary objects to be mounted can be attached. If the fastening element 12 does not have a filling opening 36, the adhering and connecting agent may alternatively be applied in sufficient quantity to the surfaces of the fastening element 12 that form the adhesive space 14, and smoothed for instance with a trowel, before the positioning of the fastening element 12 on the installation surface 10.

FIG. 1 shows a lighting device 28 with two light sources 29. The lighting device 28 may be placed onto the installation surface 10 such that the fastening element 12 is located between the light sources 29.

FIG. 2 shows a lighting device 24 with two light sources 26, which can be inserted through the insertion opening 20 of the fastening element 12 into the cavity 22 and irradiate the adhering and connecting agent through the second ring 18. To avoid damage to the lighting device 24 caused by canting within the insertion opening 20, the lighting device 24 preferably comprises a supporting structure 27.

This supporting structure 27 aligns the lighting device 24 perpendicularly to the installation surface 10 during insertion into the insertion opening 20. Furthermore, the supporting structure 27 may have two lighting devices (not depicted here), which irradiate the adhering and connecting agent through the first ring 16.

Figure 3:
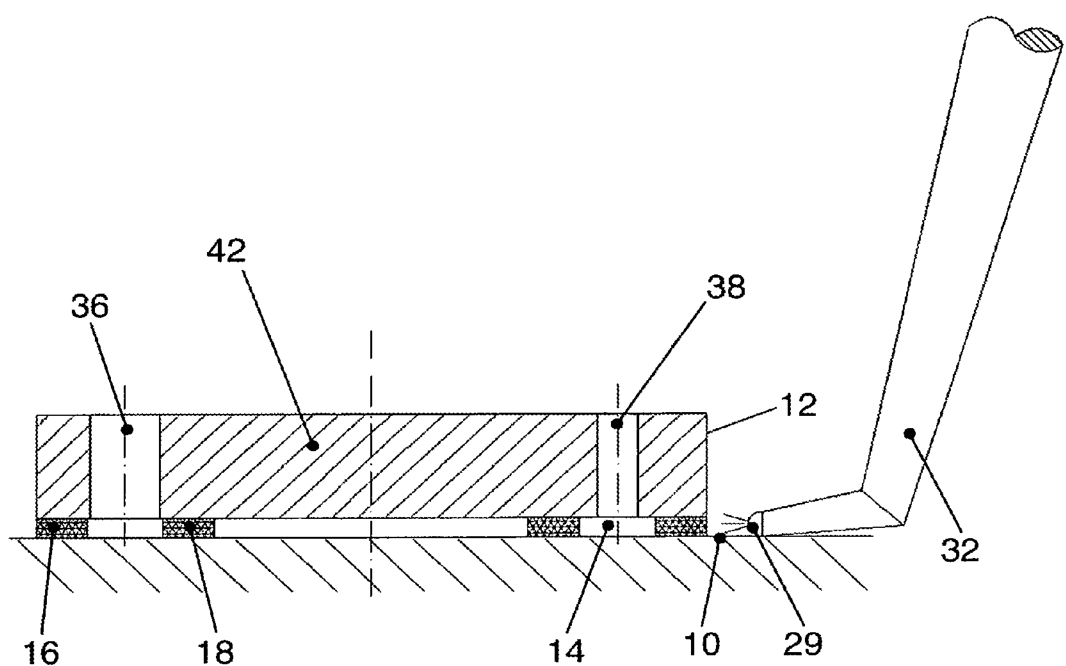
FIG. 3 shows a fastening element with a lighting device for moving around.

The lighting device 32 represented in FIG. 3 is a lighting device with a single light source 29, for example a commercially available curing lamp. For curing the adhering and connecting agent from the outside, the lighting device 32 is made to move around the fastening element 12 such that the outer side of the first ring 16 is irradiated completely.

Figure 4:
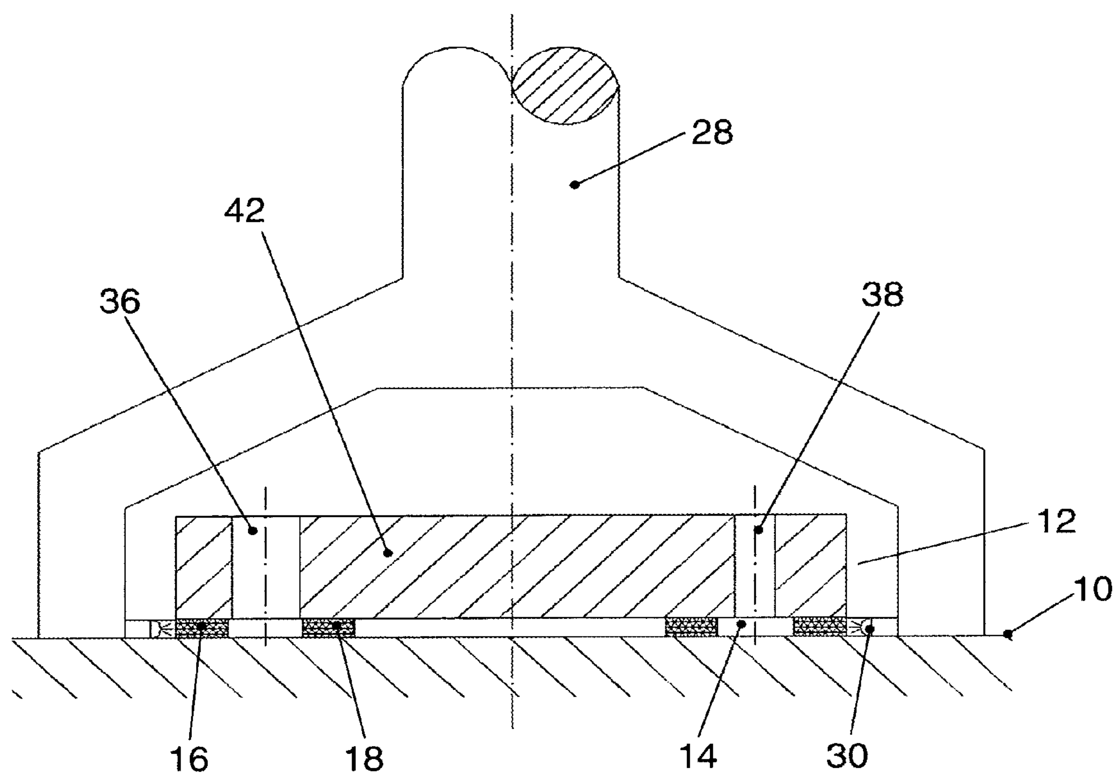
FIG. 4 shows a fastening element with a lighting device with an annular light source for placing.
Figure 5:
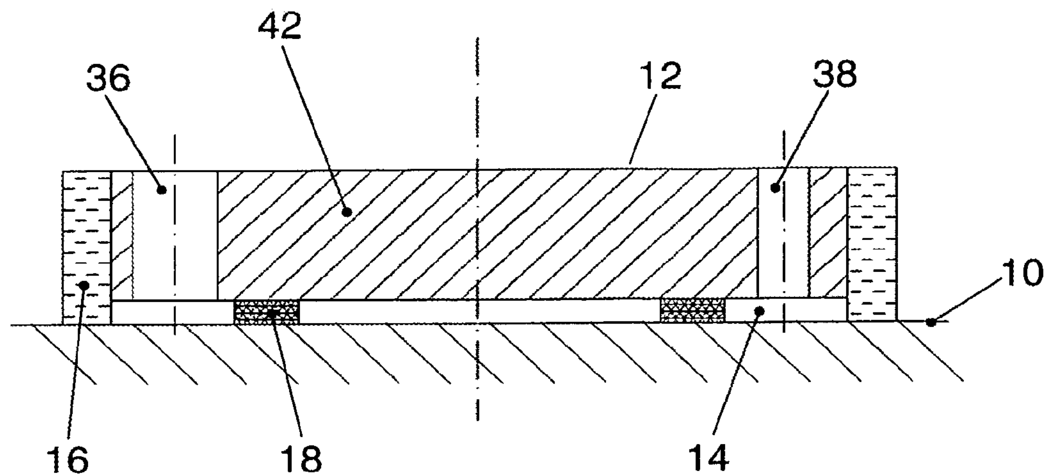
FIG. 5 shows a fastening element with a surrounding transparent element.
Figure 6:
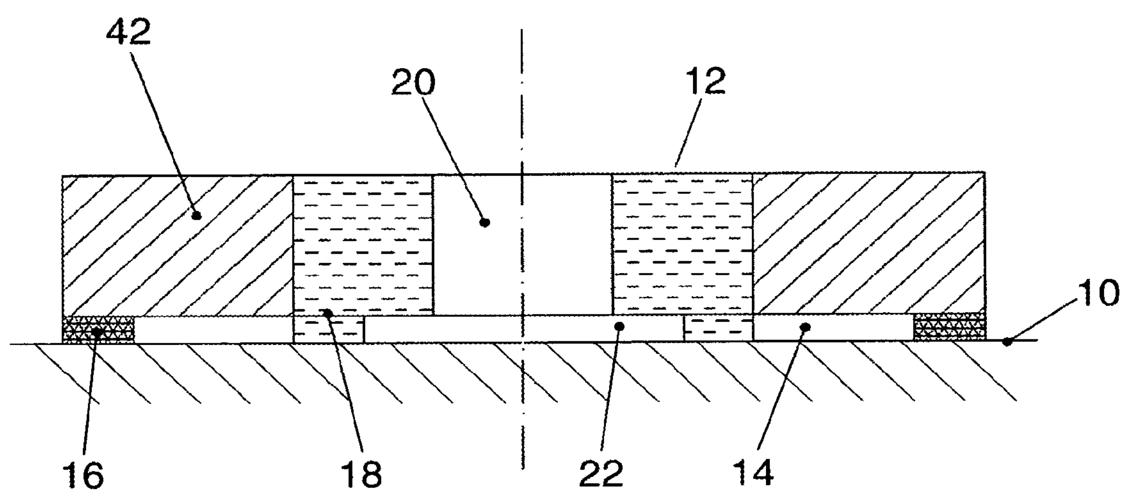
FIG. 6 shows a fastening element with a transparent element integrated in the main body.

As represented in FIG. 4, instead of a lighting device with two light sources (cf. FIG. 1), a lighting device 28 with an annular light source 30 may be placed onto the fastening element 12 pre-fixed on the installation surface 10, in order to cure the adhering and connecting agent located in the adhesive space 14.

In an embodiment of the lighting devices 24, 28 given by way of example, a device for generating light is located outside the lighting devices. The generated light is guided to the light sources 26, 29, 30 of the lighting devices 24, 28 by means of light guides. This solution makes uniform irradiation of the adhering and connecting agent possible. Moreover, the lighting device 24 can be formed so compactly that the light source 26 can be inserted into the cavity 22 through the—preferably very small—insertion opening 20. Alternatively, lenses or mirror elements may be used. It is also possible to install devices for generating light without further elements for light guidance or refraction at the location of the light sources 26, 29, 30.

DESIGNATIONS

10 Installation surface
12 Fastening element
14 Adhesive space
16 First ring
18 Second ring
20 Insertion opening
22 Cavity
24 Lighting device for inserting
26 Light source
27 Supporting structure
28 Lighting device for placing
29 Light source
30 Annular light source
32 Lighting device for moving around
34 Receiving element
36 Filling opening
38 Rising opening
40 Windows
42 Main body

LIST OF THE LITERATURE CITED

WO 03/036106 A1
DE 101 52 053 A1
WO 01/81774 A1
DE 44 16 884

The invention claimed is:

1. A fastening element for mounting stationary objects, wherein the fastening element is designed to be fastened on an installation surface by introducing a light-curing adhesive into an adhesive space formed by the installation surface and one or more components of the fastening element, comprising:
- a light-curing adhesive as an adhering and connecting agent;
- at least one of the components of the fastening element that forms the adhesive space is at least partially transparent;
- at least one of the at least partially transparent components of the fastening element is formed as a first ring, the adhesive space being located inside the first ring, and
- at least a second of the at least partially transparent components is formed as a second ring, the adhesive space being located outside the second ring,
- wherein the fastening element comprises an insertion opening and a main body, the insertion opening, the second ring and the installation surface enclosing a cavity into which a light source which irradiates at least the second ring can be inserted through the insertion opening.

2. The fastening element as claimed in claim 1, wherein the insertion opening can be closed by a receiving element.

3. The fastening element as claimed in claim 1, wherein at least one of the delimiting surfaces of the adhesive space that are identical to part of the surface of one of the at least partially transparent components of the fastening element runs parallel to the installation surface.

4. The fastening element as claimed in claim 1, wherein the fastening element has at least one filling opening and/or at least one rising opening, wherein the at least one filling opening and/or at least one rising opening can be closed with one of the at least partially transparent components of the fastening element.

5. The fastening element as claimed in claim 1, wherein at least one of the at least partially transparent components of the fastening element reflects, refracts and/or diffuses light.

6. A fastening element as claimed in claim 1, wherein said stationary objects comprises towel holders, shelves, or lights.

7. A fastening element as claimed in claim 1, wherein said installation surface comprises a wall or a ceiling.

8. A fastening element as claimed in claim 1, wherein said installation surface comprises tiles or marble slabs.

9. A lighting device for curing a light-curing adhesive, comprising:
- a fastening element as claimed in claim 1,
- a first lighting device having at least one light source, which can be inserted through the insertion opening of the fastening element into a cavity enclosed by a main body, an insertion opening, a second ring and an installation surface, so that the second ring is located in the path of rays of the at least one light source when the lighting device has been inserted into the cavity, and
- a second lighting device having at least two light sources or an annular light source, and can be placed onto the installation surface, so that the fastening element with a first ring is located between the at least two light sources or inside the annular light source, and
- wherein the first ring is located in the paths of rays of the at least two light sources or in the path of rays of the annular light source.

10. An installation system comprising a lighting device as claimed in claim 9.

11. An installation system for mounting stationary objects on an installation surface comprising one or more fastening elements as claimed in claim 1.

12. The installation system as claimed in claim 11, further comprising an adhering and connecting agent, the adhering and connecting agent being a light-curing adhesive.

13. A method using at least one fastening element, comprising:
- placing the at least one fastening element as claimed in claim 1 onto the installation surface,
- introducing the light-curing adhesive agent; and
- curing the light-curing adhesive agent by irradiation with at least one lighting device.

14. The method as claimed in claim 13 wherein the at least one lighting device comprises:
- a first lighting device having at least one light source, which can be inserted through an insertion opening of at least one fastening element into a cavity enclosed by a main body, the insertion opening, a second ring and an installation surface, so that the second ring is located in the path of rays of the at least one light source when the lighting device has been inserted into the cavity, and a second lighting device having at least two light sources or an annular light source, which can be placed onto the installation surface, so that the at least one fastening element with a first ring is located between the at least two light sources or inside the annular light source, and wherein the first ring is located in the paths of rays of the at least two light sources or in the path of rays of the annular light source.

15. A fastening element for mounting stationary objects, comprising:

a) an adhering and connecting agent comprising a light-curing adhesive;

b) at least one of the components of the fastening element being at least partially transparent and forming an adhesive space with an installation surface;

c) at least one of the at least partially transparent components of the fastening element forming a first ring, the adhesive space being located inside the first ring, and d) at least a second of the at least partially transparent components forming a second ring, the adhesive space being located outside the second ring, wherein the fastening element comprises an insertion opening and a main body, the insertion opening, the second ring and the installation surface enclosing a cavity into which a light source which irradiates at least the second ring can be inserted through the insertion opening.

* * * * *